June 20, 1950 D. KLEIS ET AL 2,512,547

IMAGE SYSTEM WITH CONVEYER HAVING PARALLEL LINES FOR DEVELOPMENT OF CONTROL SIGNALS

Filed March 3, 1948

INVENTORS

DERK KLEIS
MARTINUS VAN TOL
LOUIS RAYMOND BOURGONJON
FLORIS CORNELIS WILLEM SLOOF

BY [signature]

ATTORNEY.

Patented June 20, 1950

2,512,547

UNITED STATES PATENT OFFICE 2,512,547

IMAGE SYSTEM WITH CONVEYER HAVING PARALLEL LINES FOR DEVELOPMENT OF CONTROL SIGNALS

Derk Kleis, Martinus van Tol, Louis Raymond Bourgonjon, and Floris Cornelis Willem Sloof, Eindhoven, Netherlands, assignors to Hartford National Bank and Trust Company, Hartford, Conn., as trustee Application March 3, 1948, Serial No. 12,824
In the Netherlands March 6, 1947

5 Claims. (Cl. 178—7.1)

Figures 1, 2, 3, 4:
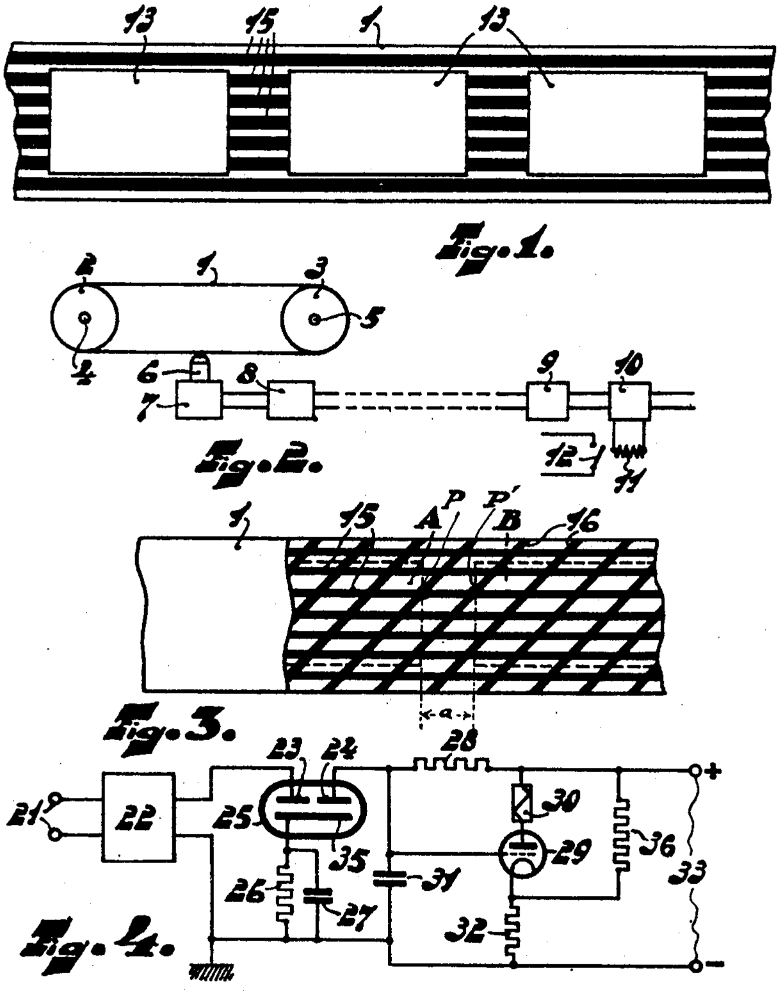

The invention relates to an arrangement for remote reproduction of letters, manuscripts and other documents in order to produce a facsimile. In such arrangements the image to be reproduced is displaced, at the transmitting end of the system, relatively to an electro-optical apparatus which scans the image by means of a narrow light beam which, upon reflection on the image surface, is received by a photoelectric cell, which converts light fluctuations in an electric signal into corresponding fluctuations of an electric current. In arrangements of this kind the electric signals produced are routed by wire or wireless to the receiving station, where they are again converted, after amplification, into fluctuations of a light beam, by the use of which the image is reproduced, for example, by causing the beam to move over photographic paper. The required synchronism between the members that bring about the movements of the beams is usually ensured by transmitting at definite instants, in addition to the said image signals, synchronizing signals which control in the desired manner the members for moving the scanning beam at the receiving end. The moments of time at which the synchronizing signals occur are chosen to be such that these signals do not interfere with the transmission of the image signals. When the image is scanned by the light beam as usual, along parallel lines, provision is therefore made for the synchronizing pulses to occur at the end of each line and between the scanning of two successive images and hence the first signal, the line-synchronizing signal indicates the end or the beginning of a line, whereas the second, the image-synchronizing signal, indicates the end or the beginning of the image.

The synchronizing signals may be produced singly in the transmitter and, at the correct instants, added to the image signals to be transmitted or they may be produced in the same manner as the image signals in the photo-electric cell, means being provided by which the latter signals have a light pulse or a light signal of particular pattern added to them at the end of the scanning of each line and of each image. It is known, for example, to indicate the beginning of a manuscript or other document by providing the paper, on the side at which scanning starts, with a given mark, which produces a signal, by which devices at the receiving end may be operated automatically, or not automatically to cut off, for example, the paper with the recorded image and replace it by a base, on which the next following image can be reproduced or to carry out a different operation which is of utility for reception.

The invention relates to an arrangement for image transmission of the above mentioned kind in which the manuscripts, documents, or other image supports required to be reproduced are passed in the transmitting station by means of a conveyor belt, relatively to the electro-optical scanning apparatus and in which, at the end of scanning of each image a definite signal is produced in the electro-optical apparatus. The invention has for its object to provide an arrangement which ensures with greater security that the operation which has to be performed in the receiving station between reception of two images takes place at the correct instant in actual fact. According to the invention, for this purpose the surface of the conveyor belt facing the electro-optical apparatus is provided with a number of equally spaced dashes, which form a contrast with the base of the conveyor belt, so that between two images the light beam moving transversely of the conveyor belt produces, in the photocell, a current of definite frequency, which after amplification in the usual manner and transmission to the receiver, is adapted to serve here to operate the devices for carrying out the said operations. The advantage of this method of producing a signal is that the signal is transmitted so long as the light beam of the electro-optical apparatus does not scan the next following image. It is thus possible, for example, to arrange the receiver in such manner that the members which have to perform here a given function at the beginning of scanning an image become operative exactly when the said signal ceases, for example, due to the provision of a device which upon occurrence of the signal starts and thus puts a spring under tension, said spring releasing when the signal ceases and thus initiating some operation such as actuating the scanning elements at the receiving position.

In order that the invention may be more clearly understood and readily carried into effect, it will now be described more fully with reference to the accompanying drawing.

Fig. 1 shows part of a conveyor belt 1, on which a number of sheets of paper 13 have been put, said sheets supporting the images to be transmitted and, during movement of the belt, adhering thereto, for example by electrostatic means.

Fig. 2 shows, in an obsolutely diagrammatical manner, the more complete arrangement, the belt 1 being assumed to pass over two rollers 2 and 3, which are adapted to rotate on shafts 4 and 5. The rollers are moved at equal speeds and the sheets of paper pass relatively to a scanning device 6.

As shown in Fig. 1, the surface of the belt on which the image-supports are put is streaked, according to the invention, in the direction of its length. Scanning is assumed to take place due to the fact that during movement of the belt the member 6 continuously performs a movement of uniform speed transverse to the belt. This may be effected, for example, by the member 6 being adapted to rotate on a shaft which is parallel to the direction of length of the belt, so that it moves along the circumference of a circle. In this case the belt at the position of the member 6 will also be conducted in such manner as to be arcuated at this position and the end of the scanning member is always at the same distance from the paper when being scanned. Use is preferably made of a number of scanning members 6 evenly distributed about the circumference of a circle.

Upon scanning of an image the scanning member 6 consequently moving along the surface of the conveyor belt provided with longitudinal streaks, there will be produced in the output circuit of a photo-electric cell, which, for example, is housed in an element 7, an alternating current the frequency of which is determined by the speed of the scanning member 6 and the spacing of the transverse streaks 15 and which may be used in the receiving station to bring about a definite switching operation. For this purpose it is passed through an amplifier 8, which may also serve to amplify the image signals, and together with these signals, is transmitted to the remote station, where it is amplified in the device 9 and then separated in the filter device 10 from the image signals. Thus, this current is adapted to be used in the above described manner, to energize a relay winding 11, which closes a contact 12, the circuit of which comprises the said members which initiate the desired operation.

A further advantage of the invention is that the signal, the frequency of which is determined by the spacing between the streaks on the conveyor belt and the scanning speed, can readily be separated from other signals by the use of a simple filter. In addition, the signal is independent of the nature of the paper on which the image is provided.

The invention also provides a means operative to assist in correct arrangement of the paper sheets on the conveyor belt, since in many cases it is desirable for the paper sheets the inscription of which is required to be reproduced at a distance, to be spaced by equal distances on the conveyor device. This could be achieved if a division in cms. were provided on the conveyor belt, but in practice this means gives rise to errors and inaccuracies.

According to the invention, correct arrangement of the sheets of paper on the conveyor belt is assisted in that its surface is provided with two sets of equidistant streaks, the streaks of one set being at a definite angle with those of the other set.

Fig. 3 shows how the two sets of streaks may be provided on the surface of the conveyor belt. The streaks 15 of the one set are preferably parallel to the direction of length of the conveyor belt, whereas those of the second set 16 are at an angle of about 45° with those of the first set. It is assumed that $a$ designates the required distance between the sheets.

Thus, if A designates the last sheet applied, its end will lie at the intersection P. In order to obtain the required distance the beginning of the sheet B must be arranged where the longitudinal streak corresponding to point P will intersect the next following oblique streak, that is to say at the point P′.

This offers the advantage that the correct position of the next following sheet of paper relatively to the preceding one can always be readily found, irrespective of the lengths, of the various sheets of paper.

In the arrangement described the oblique streaks 16 will also produce a signal which, however, is not inconvenient if a filter is provided to select the signal frequency proper. There is, otherwise, the possibility of giving the streaks 16 a definite colour, for example, red, which, if the colour of the conveyor belt is white, is not distinguished by the photocell, so that supplementary filters are not necessary.

The arrangements described may entail the disadvantage that if a letter or other document is narrow the said signal occurs not only during the time interval between the scanning of two images but also for a short time after the scanning of each line, since the scanning light beam after scanning a line falls as far as beyond the edge of the sheet and hence scans part of the surface of the conveyor belt. This might cause the device at the receiving end responsive to the signal to become operative at undue instants. Therefore, according to the invention, if the said signal occurs intermittently with high frequency in the manner described, it is suppressed or else made inoperative. Although this may be done in various ways, the arrangement shown in Fig. 4 has been found to be particularly suitable for this purpose.

The circuit-arrangement shown in Fig. 4, which is used at the receiving end, comprises a filter 22 to which the signals occurring across terminals 21 and derived, for example, from the amplifier 9 are fed and in which the said signal occurring between two images is selected. One output terminal of the filter 22 is connected to the anode 23 of a diode, the cathode 25 of which is earthed through the parallel combination of a resistance 26 and a condenser 27. The second output terminal of filter 22 is also connected to earth. Housed in the same envelop 25 as the said diode is a second diode having an anode 24 and having the cathode 35 in common with the first-mentioned diode. A condenser 31 is connected between the anode 24 and earth, whilst this anode is furthermore connected through a resistance 28 to the positive terminal of a direct voltage source connected at 33. Provision is furthermore made of a triode 29, the anode of which is connected, through a relay winding 30, to the said positive terminal. The cathode of this triode is connected through a resistance 32 to the negative terminal and to earth and is furthermore connected through a resistance 36 to the positive terminal of the supply source. The grid of the triode is connected to the anode 24. This circuit-arrangement operates as follows.

In the position of rest, when the alternating current signal does not occur, there is no conduction through the diode elements 23—35. Accordingly, there will be no biasing voltage produced across resistor 26 and substantially no voltage will be effective across the condensers 27 and 31 since the series resistance 26 and the impedances of the diodes 23, 35 are small compared with the resistance 28. Thus, the triode 29 practically does not allow current to pass, since the current passing through the resistances 36 and 32 produces across resistance 32, a comparatively high voltage which renders the grid negative with respect to the cathode. When, however, the said alternating-current signal occurs across the terminals 21, the alternating voltage will be rectified by the diode elements 23—35 and there is produced across resistance 26 a rectified voltage which voltage serves as a biasing voltage for the diode section 24—35 and produces current cut-off therein. The condenser 31 will consequently be charged through resistance 28 but this takes place comparatively slowly since the time constant of the resistance 28 and the condenser 31 has been chosen to be comparatively high. If, however, the signal occurs for a sufficiently long period, for example from the end of the scanning of one image to the beginning of the scanning of the other, the condenser 31 will be charged to a voltage such that the tube 29 takes current and the relay 30 responds. This relay initiates the required switching manipulations for example, initiates the operation of the scanning elements at the receiver. The said time constant is such that the alternating-current signals of short duration, liable to occur after the scanning of each line cannot exert any influence on the relay 30.

Figure 5:
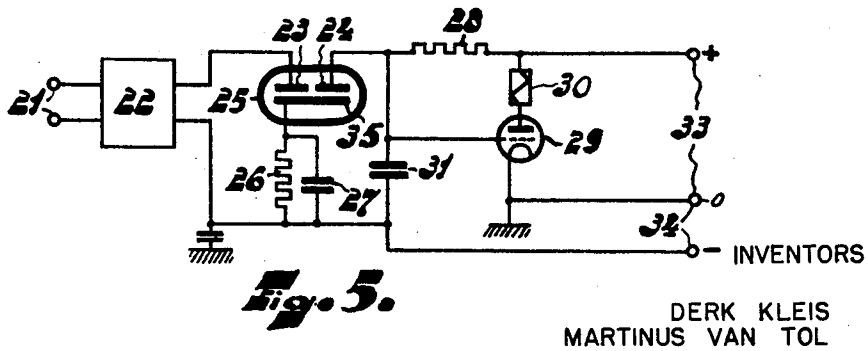

Since current passes constantly through resistances 36 and 32 and the anode 24 also takes current during the time an alternating-current signal does not occur, the arrangement consumes comparatively much energy. Fig. 5 shows a circuit-arrangement which does not exhibit this disadvantage.

This arrangement primarily corresponds to that of Fig. 4, but is differentiated as compared therewith in that the cathode of the tube 29 is earthed directly and in that the lower end of the resistance 26 is connected to a source of negative voltage of about 30 vs. The operation of this circuit-arrangement is otherwise exactly similar to that of Fig. 4, so that a description may be omitted.

What we claim is:

1. A system for electrically transmitting an image, comprising conveyor belt means for moving the image in a given direction past a given point, said belt means being provided with parallel spaced portions having contrast values different from the contrast values of portions of the belt means intermediate to said spaced portions, electro-optical means arranged at said given point for scanning said image and said belt means in a direction transverse to said given direction and thereby producing an image voltage having variations corresponding to the contrast variations of the image to be transmitted and a control voltage having variations corresponding to the contrast variations of said spaced and said intermediate portions, filter means for separating the image voltage and the control voltage, means to rectify the separated control voltage, an electron discharge tube having a cathode, a control grid and an anode, a relay member coupled to said anode, and a time delay network interposed between said rectifier and said control grid.

2. A system for electrically transmitting an image, comprising conveyor belt means for moving the image in a given direction past a given point, said belt means being provided with parallel spaced portions having contrast values different from the contrast values of portions of the conveying means intermediate to said spaced portions, electro-optical means arranged at said given point for scanning said image and said belt means in a direction transverse to said given direction and thereby producing an image voltage having variations corresponding to the contrast variations of the image to be transmitted and a control voltage having variations corresponding to the contrast variations of said spaced and said intermediate portions, filter means for separating the image voltage and the control voltage, and a control voltage transmission path both coupled to said filter means, said transmission path comprising rectifier means having a first anode, a second anode and cathode elements associated with said anodes, a first resistance element having one end thereof connected to said cathode elements, input means connected to said first anode and the other end of said resistance element, a capacitor interconnecting said second anode and the said other end of said resistance element, a second resistance element having one end thereof connected to said second anode, means to apply a positive potential to the other end of said second resistance element, an electron discharge tube having a cathode, a control grid and an output electrode, a relay member coupled to said output electrode, and means to connect said control grid to said second anode.

3. A system for electrically transmitting to a receiver an image impressed on a sheet, comprising a conveyor member on which said sheet is positioned for moving the said sheet in a given direction past a given point, said conveyor member being provided with parallel spaced portions having contrast values different from the contrast values of portions of the said conveyor member intermediate to said spaced portions and said sheet only partially covering said conveyor member, and means to produce a voltage for controlling said receiver and an image signal, said means comprising an electro-optical member arranged at said given point for scanning said conveyor member and said image sheet positioned thereon in a direction transverse to said given direction whereby a control voltage having variations corresponding to the contrast variations of said spaced and said intermediate portions is produced by the scanning of exposed portions of said conveyor member by said electro-optical member and the said image signal is produced by the scanning of said image sheet by the said electro-optical member.

4. A system for electrically transmitting to a receiver an image impressed on a sheet, comprising a conveyor belt member on which said sheet is positioned for moving the said sheet in a given direction past a given point, said conveyor member being provided with longitudinally arranged parallel spaced portions having contrast values different from the contrast values of portions of the said conveyor member intermediate to said spaced portions and said sheet only partially covering said conveyor belt member, and means to produce a voltage for controlling said receiver and an image signal, said means comprising an electro-optical member arranged at said given point for scanning said conveyor member and said image sheet positioned thereon in a direction substantially perpendicular to said given direction whereby a control voltage having variations corresponding to the contrast variations of said spaced and said intermediate portions is produced by the scanning of exposed portions of said conveyor member by said electro-optical member and the said image signal is produced by the scanning of said image sheet by the said electro-optical member.

5. A system for electrically transmitting to a receiver an image impressed on a sheet, comprising a conveyor belt member on which said sheet is positioned for moving the said sheet in a given direction past a given point, said conveyor member being provided with parallel spaced portions having contrast values different from the contrast values of portions of said conveyor member intermediate to said spaced portions and said sheet only partially covering said conveyor member, means to produce an image signal and a voltage for controlling an electro-optically reproducing member at said receiver for said image signal, said later means comprising an electro-optical member arranged at said given point for scanning said conveyor member and said image sheet positioned thereon in a direction substantially perpendicular to said given direction whereby a control voltage having variations corresponding to the contrast variations of said spaced and said intermediate portions is produced by scanning of exposed portions of said conveyor member by said electro-optical member and the said image signal is produced by the scanning of said image sheet by the said electro-optical member, and means at said receiver and responsive to said control voltage for actuating said electro-optically reproducing means.

DERK KLEIS.
MARTINUS VAN TOL.
LOUIS RAYMOND BOURGONJON.
FLORIS CORNELIS WILLEM SLOOF.

REFERENCES CITED

The following references are of record in the file of this patent:

UNITED STATES PATENTS

| Number | Name | Date |
|---|---|---|
| 1,648,687 | Hoxie | Nov. 8, 1927 |
| 1,719,392 | Cooley | July 21, 1929 |
| 2,176,680 | Nichols | Oct. 17, 1939 |
| 2,333,272 | Ridings et al. | Nov. 2, 1943 |
| 2,351,231 | Ridings | June 13, 1944 |
| 2,450,649 | Finch | Oct. 5, 1948 |

FOREIGN PATENTS

| Number | Country | Date |
|---|---|---|
| 691,914 | Germany | May 9, 1940 |